(12) United States Patent
Lei (10) Patent No.: US 11,350,407 B2
(45) Date of Patent: May 31, 2022

(54) INFORMATION INDICATING DATA IN SLOTS

(71) Applicant: Motorola Mobility LLC, Chicago, IL (US)

(72) Inventor: Haipeng Lei, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 231 days.

(21) Appl. No.: 16/623,097

(22) PCT Filed: Jun. 16, 2017

(86) PCT No.: PCT/CN2017/088730
§ 371 (c)(1),
(2) Date: Dec. 16, 2019

(87) PCT Pub. No.: WO2018/227591
PCT Pub. Date: Dec. 20, 2018

(65) Prior Publication Data
US 2020/0221455 A1    Jul. 9, 2020

(51) Int. Cl.
*H04L 1/18* (2006.01)
*H04W 72/04* (2009.01)
*H04L 1/16* (2006.01)

(52) U.S. Cl.
CPC ....... *H04W 72/0446* (2013.01); *H04L 1/1614* (2013.01); *H04L 1/1864* (2013.01)

(58) Field of Classification Search
CPC . H04W 72/0446; H04L 1/1614; H04L 1/1864
See application file for complete search history.

(56) References Cited

U.S. PATENT DOCUMENTS

| | | | |
|---|---|---|---|
| 2020/0008229 A1* | 1/2020 | Li | H04L 5/0064 |
| 2020/0067667 A1* | 2/2020 | Gou | H04L 1/1812 |

FOREIGN PATENT DOCUMENTS

| | | |
|---|---|---|
| CN | 101132262 A | 2/2008 |
| CN | 104885376 A | 9/2015 |
| CN | 105531953 A | 4/2016 |
| CN | 107113122 A | 8/2017 |
| EP | 505656 A1 | 9/1992 |

OTHER PUBLICATIONS

PCT/CN2017/088730, Notification of Transmittal of the International Search Report and the Written Opinion of the International Searching Authority, or the Declaration, dated Feb. 24, 2018, pp. 1-9.

(Continued)

*Primary Examiner* — Melvin C Marcelo
(74) *Attorney, Agent, or Firm* — Kunzler Bean & Adamson (57) ABSTRACT

Apparatuses, methods, and systems are disclosed for transmitting information indicating data in slots. One apparatus (200) includes a processor (202) that determines (602) whether a first data in a first one or more slots of multiple slots is detected and a second data in a second one or more slots of the multiple slots is not detected. The apparatus (200) includes a transmitter (210) that: transmits (604) first information indicating a decoding result of the first data; and transmits (606) second information indicating a detection result of the second data.

18 Claims, 7 Drawing Sheets

(56) References Cited

OTHER PUBLICATIONS

Xiaomi, "Consideration on URLLC HARQ design", 3GPP TSG RAN WG1-NR Meeting R1-1700452, Jan. 16-20, 2017, pp. 1-2.
Samsung "HARQ-ACK codebook determination", HARQ-ACK codebook determination, May 15-19, 2017, pp. 1-4.
3GPP, "3rd Generation Partnership Project; Technical Specification Group Radio Access Network; Evolved Universal Terrestrial Radio Access (E-UTRA); Multiplexing and channel coding (Release 14)", 3GPP TS 36.212 V14.1.0, Dec. 2016, pp. 1-176.
Huawei, Hilsilicon, "Multiplexing of multiple HARQ-ACK feedback", 3GPP TSG RAN WG1 Meeting #89 R1-1708151, May 15-19, 2017, pp. 1-3.
Ericsson, "On HARQ Codebook", GPP TSG-RAN WG1 #89 R1-1709101, May 15-19, 2017, pp. 1-2.
Nokia et al., "On HARQ feedback determination", 3GPP TSG RAN WG1#89 R1-1708527, May 15-19, 2017, pp. 1-3.

* cited by examiner

INFORMATION INDICATING DATA IN SLOTS

FIELD

The subject matter disclosed herein relates generally to wireless communications and more particularly relates to information indicating data in slots.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplexing ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, data may be transmitted in slots. In such configurations, providing feedback corresponding to the data may be difficult.

BRIEF SUMMARY

Apparatuses for transmitting information indicating data in slots are disclosed. Methods and systems also perform the functions of the apparatus. In one embodiment, the apparatus includes a processor that determines whether a first data in a first one or more slots of multiple slots is detected and a second data in a second one or more slots of the multiple slots is not detected. In certain embodiments, the apparatus includes a transmitter that: transmits first information indicating a decoding result of the first data; and transmits second information indicating a detection result of the second data.

In one embodiment, the first data includes multiple code block groups with each code block within one code block group independently decodable and the decoding result of the first data includes multiple bits with each bit corresponding to a code block group. In a further embodiment, the detection result of the second data indicates that the second data is not detected in the second one or more slots of the multiple slots. In certain embodiments, the second information includes a bitmap in which each bit of the bitmap corresponds to a slot of the multiple slots. In various embodiments, each bit of the bitmap includes a first indication that indicates that a data is not detected in the corresponding slot or a second indication that indicates that a data is detected in the corresponding slot. In some embodiments, a number of bits of the bitmap is configured via radio resource control signaling. In such embodiments, a number of slots of the multiple slots is configured via radio resource control signaling.

In certain embodiments, the first information and the second information are transmitted in different channels. In some embodiments, the apparatus includes a receiver that receives information indicating a total number of code block groups being transmitted in the multiple slots. In various embodiments, the receiver further receives information indicating a number of already transmitted code block groups.

In one embodiment, the processor determines that the second data in the second one or more slots of the multiple slots is not detected based on the information indicating the total number of code block groups in the multiple slots, the information indicating the number of already transmitted code block groups, or some combination thereof. In certain embodiments, the processor determines that a number of code block groups of the second data in the second one or more slots of the multiple slots based on the information indicating the total number of code block groups in the multiple slots, the information indicating the number of already transmitted code block groups, or some combination thereof. In some embodiments, the second information includes a same number of negative acknowledgement bits corresponding to the code block groups of the second data in the second one or more slots of the multiple slots. In various embodiments, the second information includes a bit code from a set of predetermined bit codes.

A method for transmitting information indicating data in slots, in one embodiment, includes determining whether a first data in a first one or more slots of multiple slots is detected and a second data in a second one or more slots of the multiple slots is not detected. In some embodiments, the method includes transmitting first information indicating a decoding result of the first data. In certain embodiments, the method includes transmitting second information indicating a detection result of the second data.

In one embodiment, an apparatus for receiving information indicating data in slots includes a transmitter that transmits a first data in a first one or more slots of multiple slots and a second data in a second one or more slots of the multiple slots. In certain embodiments, the apparatus includes a receiver that: receives first information indicating a decoding result of the first data in the first one or more slots of the multiple slots; and receives second information indicating a detection result of the second data in the second one or more slots of the multiple slots.

In certain embodiments, the first data includes multiple code block groups with each code block within one code block group independently decodable and the decoding result of the first data includes multiple bits with each bit corresponding to a code block group. In various embodiments, the detection result of the second data indicates a second data is not detected in the second one or more slots of the multiple slots. In some embodiments, the second information includes a bitmap in which each bit of the bitmap corresponds to a slot of the multiple slots.

In certain embodiments, each bit of the bitmap includes a first indication that indicates that a data is not detected in the corresponding slot or a second indication that indicates that a data is detected in the corresponding slot. In some embodiments, a number of bits of the bitmap is configured via radio resource control signaling. In various embodiments, a number of slots of the multiple slots is configured via radio resource control signaling. In one embodiment, the first information and the second information are received in different channels.

In various embodiments, the transmitter further transmits information indicating a total number of code block groups being transmitted in the multiple slots. In certain embodiments, the transmitter further transmits information indicating a number of already transmitted code block groups. In some embodiments, the second information includes a same number of negative acknowledgement bits corresponding to the code block groups of the second data in the second one or more slots of the multiple slots. In one embodiment, the second information includes a bit code from a set of predetermined bit codes.

A method for receiving information indicating data in slots, in one embodiment, includes transmitting a first data in a first one or more slots of multiple slots and a second data in a second one or more slots of the multiple slots. In certain embodiments, the method includes receiving first information indicating a decoding result of the first data in the first one or more slots of the multiple slots. In some embodiments, the method includes receiving second information indicating a detection result of the second data in the second one or more slots of the multiple slots.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
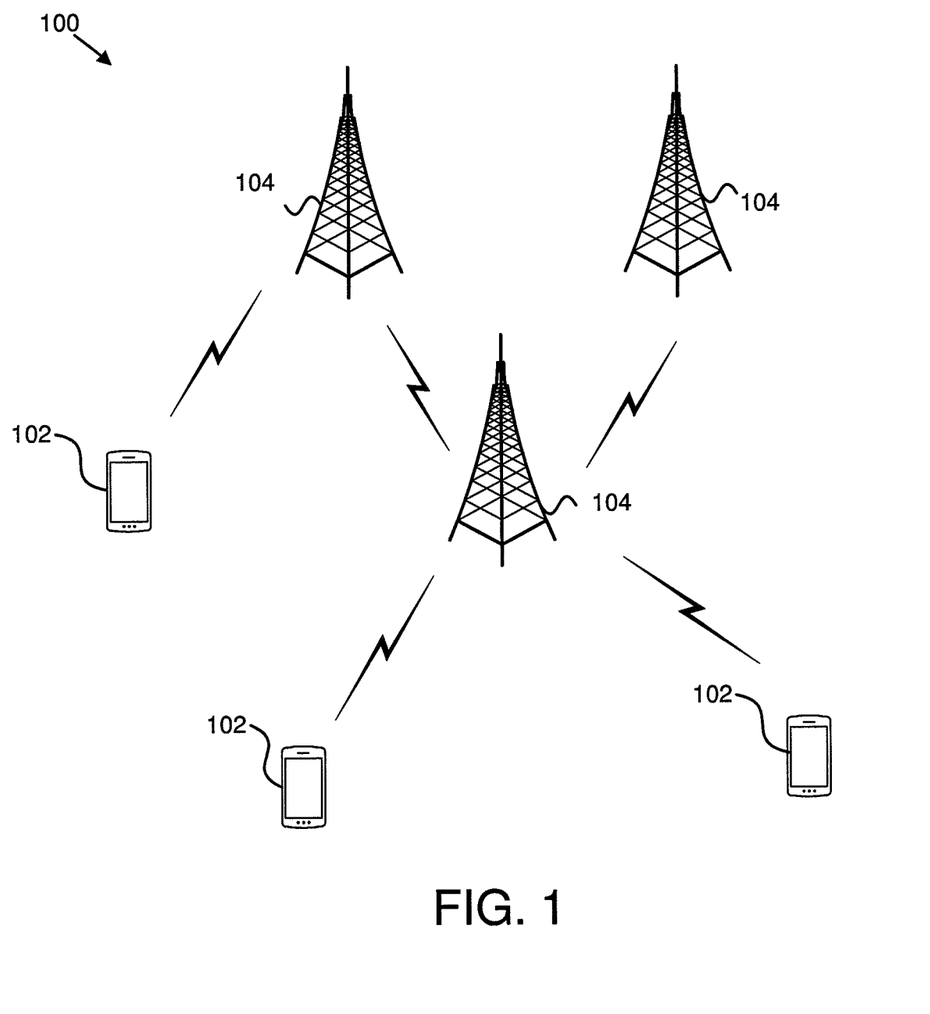
FIG. 1 is a schematic block diagram illustrating one embodiment of a wireless communication system for transmitting and/or receiving information indicating data in slots.

FIG. 1 depicts an embodiment of a wireless communication system 100 for transmitting and/or receiving information indicating data in slots. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may determine whether a first data in a first one or more slots of multiple slots is detected and a second data in a second one or more slots of the multiple slots is not detected. As used herein, data being "detected" may refer to detecting data in a PDSCH in a slot, identifying data in a slot, detecting a PDSCH in a slot, and so forth. In some embodiments, the remote unit 102 may transmit first information indicating a decoding result of the first data. As used herein, a "decoding result" may refer to information (e.g., HARQ-ACK) that indicates whether detected PDSCH are decoded properly. In certain embodiments, the remote unit 102 may transmit second information indicating a detection result of the second data. As used herein, a "detection result" may refer to information that indicates whether one or more PDSCH are detected within a slot or bundle window. Accordingly, a remote unit 102 may be used for transmitting information indicating data in slots.

In certain embodiments, a base unit 104 may transmit a first data in a first one or more slots of multiple slots and a second data in a second one or more slots of the multiple slots. In certain embodiments, the base unit 104 may receive first information indicating a decoding result of the first data in the first one or more slots of the multiple slots. In some embodiments, the base unit 104 may receive second information indicating a detection result of the second data in the second one or more slots of the multiple slots. Accordingly, a base unit 104 may be used for receiving information indicating data in slots.

Figure 2:
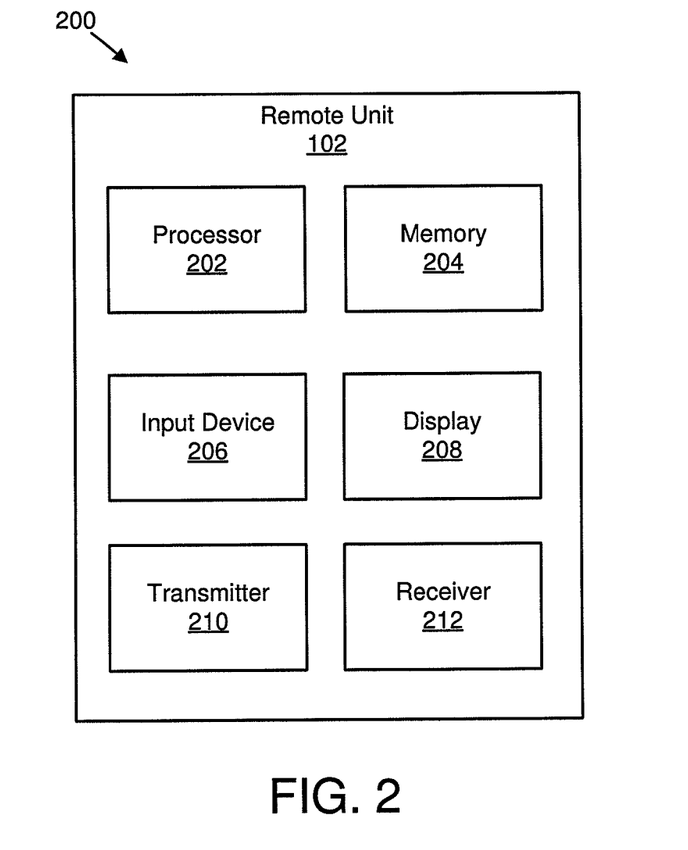
FIG. 2 is a schematic block diagram illustrating one embodiment of an apparatus that may be used for transmitting information indicating data in slots.

FIG. 2 depicts one embodiment of an apparatus 200 that may be used for transmitting information indicating data in slots. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may determine whether a first data in a first one or more slots of multiple slots is detected and a second data in a second one or more slots of the multiple slots is not detected. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to slots. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the transmitter 210 may be used to transmit first information indicating a decoding result of a first data. In various embodiments, the transmitter 210 may be used to transmit second information indicating a detection result of a second data. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
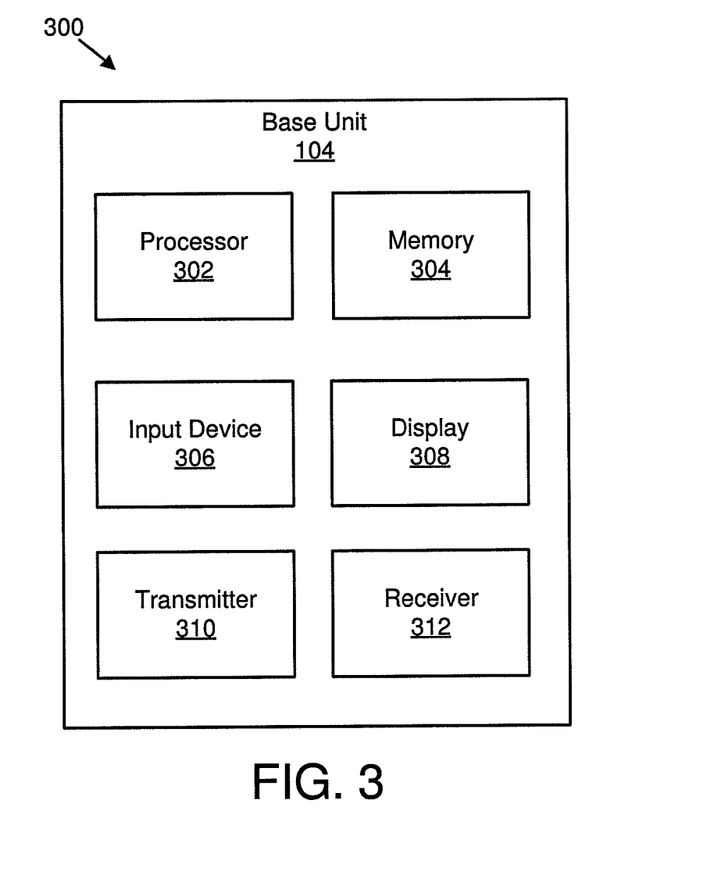
FIG. 3 is a schematic block diagram illustrating one embodiment of an apparatus that may be used for receiving information indicating data in slots.

FIG. 3 depicts one embodiment of an apparatus 300 that may be used for receiving information indicating data in slots. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the transmitter 310 may be used to transmit a first data in a first one or more slots of multiple slots and a second data in a second one or more slots of the multiple slots. In certain embodiments, the receiver 312 may be used to receive first information indicating a decoding result of the first data in the first one or more slots of the multiple slots. In some embodiments, the receiver 312 may be used to receive second information indicating a detection result of the second data in the second one or more slots of the multiple slots. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, there may be various alternatives for code block group ("CBG") based HARQ-ACK codebook size determination to facilitate synchronizing an understanding of a HARQ-ACK codebook size between a base unit 104 and a remote unit 102. Certain embodiments of such alternatives are described in relation to FIGS. 4 and 5.

Figure 4:
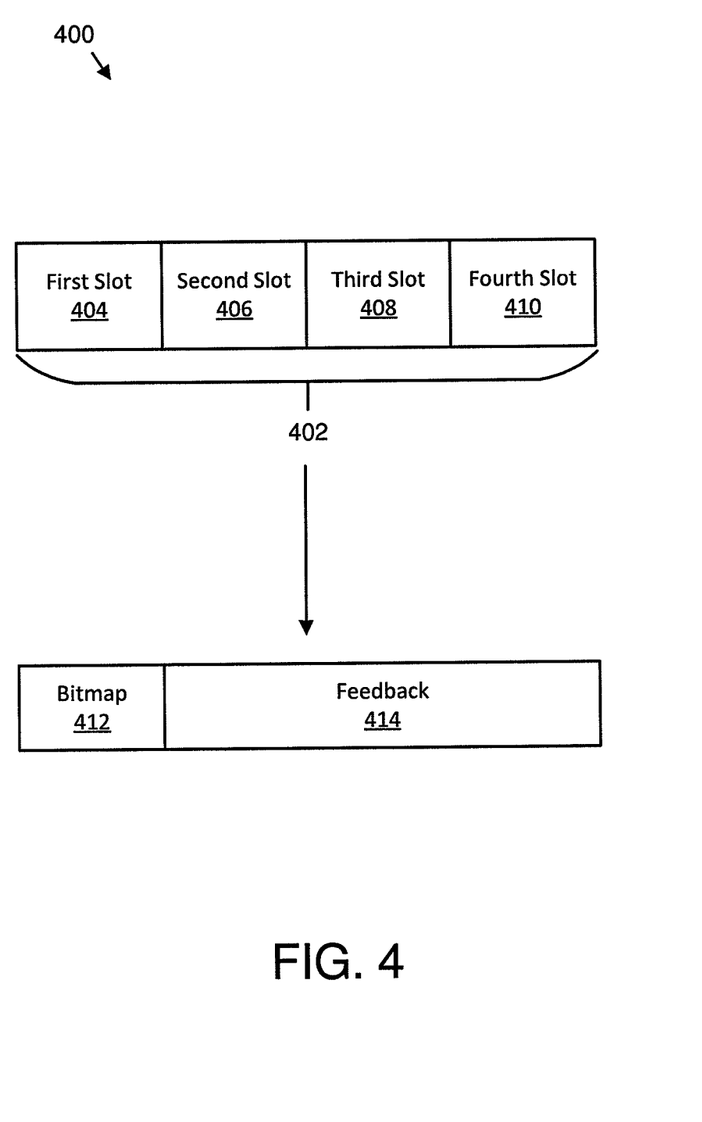
FIG. 4 is a schematic block diagram illustrating one embodiment of information indicating data in slots.

FIG. 4 is a schematic block diagram illustrating one embodiment of information 400 indicating data in slots. A bundle window 402 includes a first slot 404, a second slot 406, a third slot 408, and a fourth slot 410. Although the bundle window 402 illustrated in FIG. 4 includes four slots, the bundle window 402 may include any suitable number of slots. In various embodiments, the bundle window 402 may have only one slot in time domain and have multiple PDSCH transmissions in multiple carriers.

The information 400 indicating data in slots may include a bitmap 412 that may be included in UCI bits besides generated feedback 414 (e.g., CBG-based HARQ-ACK bits for DL used to indicate multiple PDSCH transmissions). Each bit of the bitmap 412 may correspond to one slot within the bundle window 402. For example, in one embodiment, the bitmap 412 may include four bits with each bit corresponding to a respective slot of the first through fourth slots 404-410. In certain embodiments, in response to at least one PDSCH being detected in one slot, then a corresponding bit may be set to "1"; otherwise, the corresponding bit may be set to "0." As an example, the bitmap 412 may include the following four bit indications [1 0 1 1] used to indicate that at least one PDSCH is detected in the first slot 404, the third slot 408, and the fourth slot 410, and that no PDSCH is detected in the second slot 406. After decoding the detected PDSCHs within the bundle window 402, HARQ-ACK bits corresponding to all the actually scheduled CBGs of multiple PDSCHs may be concatenated so that there is one HARQ-ACK bit per CBG. Then the UCI bits to be transmitted from the remote unit 102 to the base unit 104 includes the bitmap 412 and the feedback 414 (e.g., the HARQ-ACK bits). In one embodiment, the bitmap 412 is appended at the end of the feedback 414. In another embodiment, the feedback 414 is appended at the end of the bitmap 412, as illustrated in FIG. 4. In certain embodiments, the bitmap 412 and the feedback 414 are transmitted in separate PUCCH channels so that the base unit 104 may firstly detect the bitmap 412 to know a number of HARQ-ACK bits in the feedback 414 then to detect the concrete HARQ-ACK bits.

In such embodiments, the two separate PUCCH channels may be transmitted in a same slot or different slots.

In various embodiments, the HARQ-ACK bits correspond to the CBGs of detected PDSCHs. In some embodiments, in response to no PDSCH being detected in one slot, then no HARQ-ACK bit is mapped. In certain embodiments, a length of the bitmap 412 may be dependent on a number of slots within the bundle window 402. In one embodiment, a length of the bitmap 412 is configured by the base unit 104 via RRC signaling, such as at a time in which the base unit 104 configures the remote unit 102 to work in CBG-based (re)transmission. In various embodiments, a length of the bitmap 412 is equal to a size of the bundle window 402 and the size of the bundle window 402 is configured by the base unit 104 via RRC signaling. In certain embodiments, the bundle window 402 may be determined by a downlink assignment index ("DAI") or by dynamically indicated HARQ-ACK feedback timing. Such embodiments may be suitable for UCI bits larger or equal to 12 because polar coding with CRC protection may be used thereby facilitating the base unit 104 knowing whether the received UCI bits are correct.

In another embodiment, a new field may be included in UCI bits (instead of the bitmap 412) besides the feedback 414 (e.g., generated CBG-based HARQ-ACK bits for DL multiple PDSCH transmissions). In certain embodiments, the new field may indicate whether one or more PDSCH are detected or missed within the bundle window 402. Various embodiments of a mapping table for values for the new field are provided in Tables 1 through 4 that show using 3 or 4 bits for a bundle window size equal to 4. In some embodiments, in response to decoding the detected PDSCHs within the bundle window 402, HARQ-ACK bits corresponding to all the actually scheduled CBGs of multiple PDSCHs may be concatenated. Then UCI bits to be transmitted from the remote unit 102 to the base unit 104 may include the new field plus the feedback 414. In one embodiment, the new field may be appended at the end of the feedback 414. In another embodiment, the feedback 414 may be appended at the end of the new field. In certain embodiments, the new field and the feedback 414 are transmitted in separate PUCCH channels so that the base unit 104 may firstly detect the new field to know a number of HARQ-ACK bits in the feedback 414 then to detect the concrete HARQ-ACK bits. In such embodiments, the two separate PUCCH channels may be transmitted in a same slot or different slots.

In various embodiments, the HARQ-ACK bits correspond to the CBGs of detected PDSCHs. In some embodiments, in response to no PDSCH being detected in one slot, then no HARQ-ACK bit is mapped. In certain embodiments, the bundle window 402 may be determined by a DAI or by dynamically indicated HARQ-ACK feedback timing. Such embodiments may be suitable for UCI bits larger or equal to 12 because polar coding with CRC protection may be used thereby facilitating the base unit 104 knowing whether the received UCI bits are correct.

TABLE 1

| Code bits | Interpretation |
| --- | --- |
| 000 | No PDSCH is missed |
| 001 | PDSCH in $1^{st}$ slot is missed |
| 010 | PDSCH in $2^{nd}$ slot is missed |
| 011 | PDSCH in $3^{rd}$ slot is missed |
| 100 | PDSCH in $4^{th}$ slot is missed |
| 101 | PDSCHs in $1^{st}$ slot and $2^{nd}$ slot are missed |
| 110 | PDSCHs in $2^{nd}$ slot and $3^{rd}$ slot are missed |
| 111 | PDSCHs in $3^{rd}$ slot and $4^{th}$ slot are missed |

TABLE 2

| Code bits | Interpretation |
| --- | --- |
| 0000 | No PDSCH is missed |
| 0001 | PDSCH in $1^{st}$ slot is missed |
| 0010 | PDSCH in $2^{nd}$ slot is missed |
| 0011 | PDSCH in $3^{rd}$ slot is missed |
| 0100 | PDSCH in $4^{th}$ slot is missed |
| 0101 | PDSCHs in $1^{st}$ slot and $2^{nd}$ slot are missed |
| 0110 | PDSCHs in $2^{nd}$ slot and $3^{rd}$ slot are missed |
| 0111 | PDSCHs in $3^{rd}$ slot and $4^{th}$ slot are missed |
| 1000 | PDSCHs in $1^{st}$ slot and $4^{th}$ slot are missed |
| 1001 | PDSCHs in $1^{st}$ slot and $2^{nd}$ slot and $3^{rd}$ slot are missed |
| 1010 | PDSCHs in $2^{nd}$ slot and $3^{rd}$ slot and $4^{th}$ slot and are missed |
| 1011 | PDSCHs in $1^{st}$ slot and $2^{nd}$ slot and $4^{th}$ slot are missed |
| 1100 | PDSCHs in $1^{st}$ slot and $3^{rd}$ slot and $4^{th}$ slot are missed |
| others | reserved |

TABLE 3

| Code bits | Interpretation |
| --- | --- |
| 000 | PDSCHs in all slots are detected |
| 001 | PDSCHs in $1^{st}$ slot and $2^{nd}$ slot and $3^{rd}$ slot are detected |
| 010 | PDSCHs in $2^{nd}$ slot and $3^{rd}$ slot and $4^{th}$ slot are detected |
| 011 | PDSCHs in $1^{st}$ slot and $3^{rd}$ slot and $4^{th}$ slot are detected |
| 100 | PDSCHs in $1^{st}$ slot and $2^{nd}$ slot and $4^{th}$ slot are detected |
| 101 | PDSCHs in $1^{st}$ slot and $2^{nd}$ slot are detected |
| 110 | PDSCHs in $2^{nd}$ slot and $3^{rd}$ slot are detected |
| 111 | PDSCHs in $3^{rd}$ slot and $4^{th}$ slot are detected |

TABLE 4

| Code bits | Interpretation |
| --- | --- |
| 0000 | PDSCHs in all slots are detected |
| 0001 | Only PDSCHs in $1^{st}$ slot and $2^{nd}$ slot and $3^{rd}$ slot are detected |
| 0010 | Only PDSCHs in $2^{nd}$ slot and $3^{rd}$ slot and $4^{th}$ slot are detected |
| 0011 | Only PDSCHs in $1^{st}$ slot and $2^{nd}$ slot and $4^{th}$ slot are detected |
| 0100 | Only PDSCHs in $1^{st}$ slot and $3^{rd}$ slot and $4^{th}$ slot are detected |
| 0101 | Only PDSCHs in $1^{st}$ slot and $2^{nd}$ slot are detected |
| 0110 | Only PDSCHs in $2^{nd}$ slot and $3^{rd}$ slot are detected |
| 0111 | Only PDSCHs in $3^{rd}$ slot and $4^{th}$ slot are detected |

TABLE 4-continued

| Code bits | Interpretation |
| --- | --- |
| 1000 | Only PDSCHs in $1^{st}$ slot and $3^{rd}$ slot are detected |
| 1001 | Only PDSCHs in $1^{st}$ slot and $4^{th}$ slot are detected |
| 1010 | Only PDSCHs in $2^{nd}$ slot and $4^{th}$ slot are detected |
| 1011 | Only PDSCH in $1^{st}$ slot is detected |
| 1100 | Only PDSCH in $2^{nd}$ slot is detected |
| 1101 | Only PDSCH in $3^{rd}$ slot is detected |
| 1110 | Only PDSCH in $4^{th}$ slot is detected |
| others | reserved |

Figure 5:
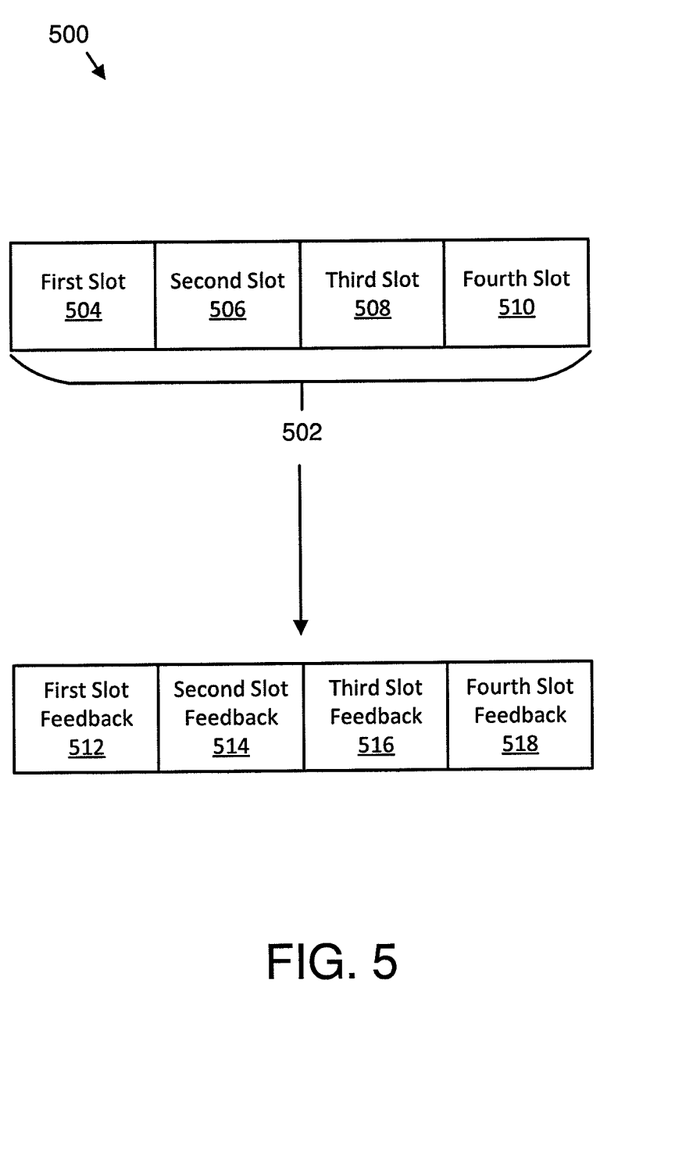
FIG. 5 is a schematic block diagram illustrating another embodiment of information indicating data in slots.

FIG. 5 is a schematic block diagram illustrating another embodiment of information 500 indicating data in slots. A bundle window 502 includes a first slot 504, a second slot 506, a third slot 508, and a fourth slot 510. Although the bundle window 502 illustrated in FIG. 5 includes four slots, the bundle window 502 may include any suitable number of slots. The information 500 includes a first slot feedback 512, a second slot feedback 514, a third slot feedback 516, and a fourth slot feedback 518. The first slot feedback 512 includes feedback corresponding to the first slot 504, the second slot feedback 514 includes feedback corresponding to the second slot 506, the third slot feedback 516 includes feedback corresponding to the third slot 508, and the fourth slot feedback 518 includes feedback corresponding to the fourth slot 510. In certain embodiments, in response to no PDSCH being detected within a slot, the slot feedback corresponding to the slot may include a number of NACKs equal to the number of CBGs not detected within the slot. In various embodiments, in response to no PDSCH detected within the bundle window 502, no feedback is transmitted.

Accordingly, in various embodiments, a number of already scheduled CBGs with consideration of CBGs in previous one or more slots and a current slot may be indicated to the remote unit 102 in each DL assignment for scheduling the associated PDSCH within the bundle window 502. Moreover, in certain embodiments, a HARQ-ACK codebook size for the bundle window 502 may be indicated in each DL assignment for scheduling the associated PDSCH within the bundle window 502. In some embodiments, the number of already scheduled CBGs may be updated slot by slot to indicate the number of already scheduled CBGs. In various embodiments, a concrete value of the number of already scheduled CBGs may be the addition of the number of already scheduled CBGs in one or more previous slots and the current slot of the bundle window 502. In certain embodiments, a number of bits to indicate the two numbers may be equal to log 2(bundle window size*maximum number of configured CBGs of one TB). In various embodiments, in response to decoding the detected PDSCHs within the bundle window 502 at the remote unit 102, the HARQ-ACK codebook size may be equal to the indicated HARQ-ACK codebook size. In some embodiments, for missed PDSCH, NACK bits may be mapped to the corresponding slot feedback and the number of NACK bits may correspond to the number of CBGs not detected.

In some embodiments, a size of the bundle window 502 may be configured by the base unit 104 via RRC signaling. In certain embodiments, a maximum number of CBGs of one TB may be configured by the base unit 104 via RRC signaling. In various embodiments, the bundle window 402 may be determined by a DAI or by dynamically indicated HARQ-ACK feedback timing.

Figure 6:
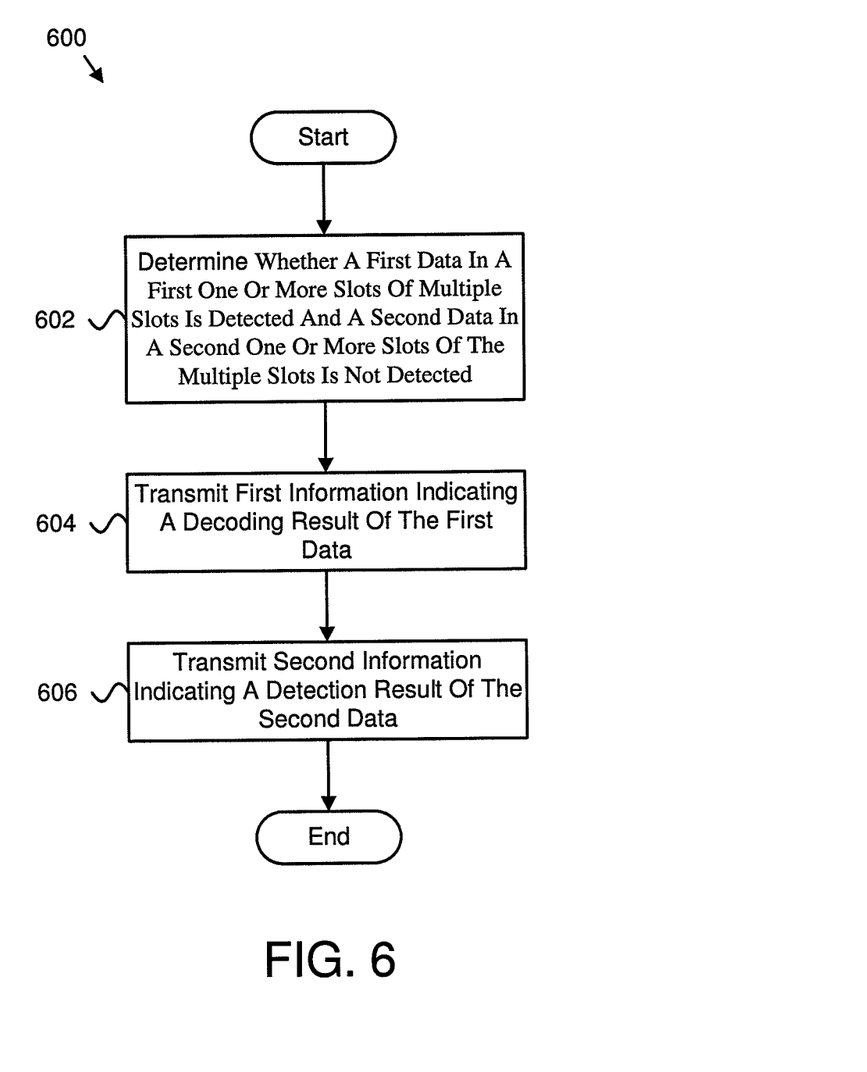
FIG. 6 is a schematic flow chart diagram illustrating one embodiment of a method for transmitting information indicating data in slots.

FIG. 6 is a schematic flow chart diagram illustrating one embodiment of a method 600 for transmitting information indicating data in slots. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include determining 602 whether a first data in a first one or more slots of multiple slots is detected and a second data in a second one or more slots of the multiple slots is not detected. In some embodiments, the method 600 includes transmitting 604 first information indicating a decoding result of the first data. In certain embodiments, the method 600 includes transmitting 606 second information indicating a detection result of the second data.

In one embodiment, the first data includes multiple code block groups with each code block within one code block group independently decodable and the decoding result of the first data includes multiple bits with each bit corresponding to a code block group. As used herein, a code block being "independently" decodable may mean that a code block may be decoded separately from (e.g., without relying on) other code blocks. In a further embodiment, the detection result of the second data indicates that the second data is not detected in the second one or more slots of the multiple slots. In certain embodiments, the second information includes a bitmap in which each bit of the bitmap corresponds to a slot of the multiple slots. In various embodiments, each bit of the bitmap includes a first indication that indicates that a data is not detected in the corresponding slot or a second indication that indicates that a data is detected in the corresponding slot. In some embodiments, a number of bits of the bitmap is configured via radio resource control signaling. In such embodiments, a number of slots of the multiple slots is configured via radio resource control signaling.

In certain embodiments, the first information and the second information are transmitted in different channels. In some embodiments, the method 600 includes receiving information indicating a total number of code block groups being transmitted in the multiple slots. In various embodiments, the method 600 includes receiving information indicating a number of already transmitted code block groups.

In one embodiment, the method 600 includes determining that the second data in the second one or more slots of the multiple slots is not detected based on the information indicating the total number of code block groups in the multiple slots, the information indicating the number of already transmitted code block groups, or some combination thereof. In certain embodiments, the method 600 includes determining that a number of code block groups of the second data in the second one or more slots of the multiple slots based on the information indicating the total number of code block groups in the multiple slots, the information indicating the number of already transmitted code block groups, or some combination thereof. In some embodiments, the second information includes a same number of negative acknowledgement bits corresponding to the code block groups of the second data in the second one or more slots of the multiple slots. In various embodiments, the second information includes a bit code from a set of predetermined bit codes.

Figure 7:
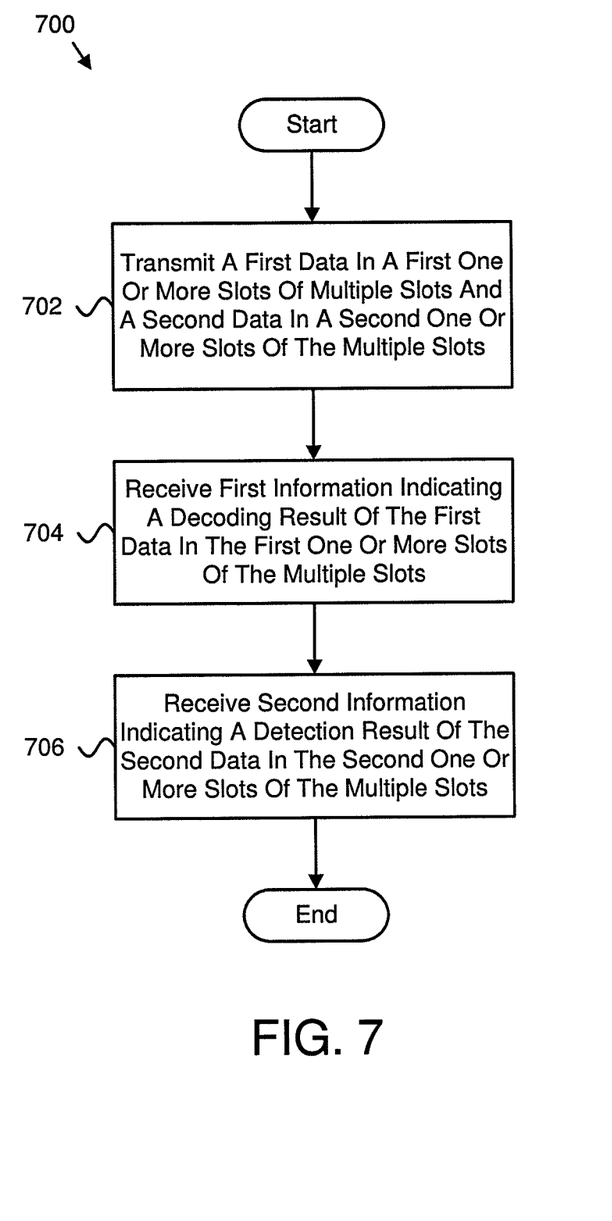
FIG. 7 is a schematic flow chart diagram illustrating one embodiment of a method for receiving information indicating data in slots.

FIG. 7 is a schematic flow chart diagram illustrating one embodiment of a method 700 for receiving information indicating data in slots. In some embodiments, the method 700 is performed by an apparatus, such as the base unit 104.

In certain embodiments, the method 700 may be performed by a processor executing program code, for example, a microcontroller, a microprocessor, a CPU, a GPU, an auxiliary processing unit, a FPGA, or the like.

The method 700 may include transmitting 702 a first data in a first one or more slots of multiple slots and a second data in a second one or more slots of the multiple slots. In certain embodiments, the method 700 includes receiving 704 first information indicating a decoding result of the first data in the first one or more slots of the multiple slots. In some embodiments, the method 700 includes receiving 706 second information indicating a detection result of the second data in the second one or more slots of the multiple slots.

In certain embodiments, the first data includes multiple code block groups with each code block within one code block group independently decodable and the decoding result of the first data includes multiple bits with each bit corresponding to a code block group. In various embodiments, the detection result of the second data indicates a second data is not detected in the second one or more slots of the multiple slots. In some embodiments, the second information includes a bitmap in which each bit of the bitmap corresponds to a slot of the multiple slots.

In certain embodiments, each bit of the bitmap includes a first indication that indicates that a data is not detected in the corresponding slot or a second indication that indicates that a data is detected in the corresponding slot. In some embodiments, a number of bits of the bitmap is configured via radio resource control signaling. In various embodiments, a number of slots of the multiple slots is configured via radio resource control signaling. In one embodiment, the first information and the second information are received in different channels.

In various embodiments, the method 700 includes transmitting information indicating a total number of code block groups being transmitted in the multiple slots. In certain embodiments, the method 700 includes transmitting information indicating a number of already transmitted code block groups. In some embodiments, the second information includes a same number of negative acknowledgement bits corresponding to the code block groups of the second data in the second one or more slots of the multiple slots. In one embodiment, the second information includes a bit code from a set of predetermined bit codes.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
 a processor that determines whether a first data in a first one or more slots of a plurality of slots is detected and a second data in a second one or more slots of the plurality of slots is not detected; and
 a transmitter that:
  transmits first information indicating a decoding result of the first data, wherein the first information comprises a first bitmap indicating hybrid automatic repeat request feedback for the first one or more slots; and
  transmits second information indicating a detection result of the second data, wherein the second information comprises a second bitmap having at least one detection bit, each bit of the at least one detection bit corresponds to a slot of the second one or more slots of the plurality of slots and indicates whether the second data is detected in the slot, and the first information is transmitted together with the second information.

2. The apparatus of claim 1, wherein the first data comprises a plurality of code block groups with each code block within one code block group independently decodable and the decoding result of the first data comprises a plurality of bits with each bit corresponding to a code block group.

3. The apparatus of claim 1, wherein the detection result of the second data indicates that the second data is not detected in the second one or more slots of the plurality of slots.

4. The apparatus of claim 1, wherein each bit of the bitmap comprises a first indication that indicates that a data is not detected in the corresponding slot or a second indication that indicates that a data is detected in the corresponding slot.

5. The apparatus of claim 1, wherein a number of bits of the bitmap is configured via radio resource control signaling.

6. The apparatus of claim 1, wherein a number of slots of the plurality of slots is configured via radio resource control signaling.

7. The apparatus of claim 1, wherein the first information and the second information are transmitted in different channels.

8. The apparatus of claim 1, further comprising a receiver that receives information indicating a total number of code block groups being transmitted in the plurality of slots.

9. The apparatus of claim 8, wherein the receiver further receives information indicating a number of already transmitted code block groups.

10. The apparatus of claim 9, wherein the processor determines that the second data in the second one or more slots of the plurality of slots is not detected based on the information indicating the total number of code block groups in the plurality of slots, the information indicating the number of already transmitted code block groups, or some combination thereof.

11. The apparatus of claim 9, wherein the processor determines that a number of code block groups of the second data in the second one or more slots of the plurality of slots based on the information indicating the total number of code block groups in the plurality of slots, the information indicating the number of already transmitted code block groups, or some combination thereof.

12. The apparatus of claim 11, wherein the second information comprises a same number of negative acknowledgement bits corresponding to the code block groups of the second data in the second one or more slots of the plurality of slots.

13. The apparatus of claim 1, wherein the second information comprises a bit code from a set of predetermined bit codes.

14. A method comprising:
 determining whether a first data in a first one or more slots of a plurality of slots is detected and a second data in a second one or more slots of the plurality of slots is not detected;
 transmitting first information indicating a decoding result of the first data, wherein the first information comprises a first bitmap indicating hybrid automatic repeat request feedback for the first one or more slots; and
 transmitting second information indicating a detection result of the second data wherein the second information comprises a second bitmap having at least one detection bit, each bit of the at least one detection bit corresponds to a slot of the second one or more slots of the plurality of slots and indicates whether the second data is detected in the slot, and the first information is transmitted together with the second information.

15. An apparatus comprising:
a transmitter that transmits a first data in a first one or more slots of a plurality of slots and a second data in a second one or more slots of the plurality of slots; and
a receiver that:
receives first information indicating a decoding result of the first data in the first one or more slots of the plurality of slots, wherein the first information comprises a first bitmap indicating hybrid automatic repeat request feedback for the first one or more slots; and
receives second information indicating a detection result of the second data in the second one or more slots of the plurality of slots, wherein the second information comprises a second bitmap having at least one detection bit, each bit of the at least one detection bit corresponds to a slot of the second one or more slots of the plurality of slots and indicates whether the second data is detected in the slot, and the first information is transmitted together with the second information.

16. The apparatus of claim 15, wherein the detection result of the second data indicates a second data is not detected in the second one or more slots of the plurality of slots.

17. The apparatus of claim 15, wherein each bit of the bitmap comprises a first indication that indicates that a data is not detected in the corresponding slot or a second indication that indicates that a data is detected in the corresponding slot.

18. The apparatus of claim 15, wherein the second information comprises a bit code from a set of predetermined bit codes.

* * * * *